United States Patent
Hahn et al.

(10) Patent No.: US 10,349,411 B2
(45) Date of Patent: Jul. 9, 2019

(54) ASSIGN BAND MODES AND CHANNELS TO WIRELESS NODES

(71) Applicant: Hewlett Packard Enterprise Development LP, Houston, TX (US)

(72) Inventors: Dongwoon Hahn, Santa Clara, CA (US); Mathieu Mercier, Laval (CA); Sachin Ganu, San Jose, CA (US); Nethra Muniyappa, Santa Clara, CA (US); Sree Harsha, Santa Clara, CA (US); Rajini Balay, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/817,867

(22) Filed: Nov. 20, 2017

(65) Prior Publication Data

US 2019/0159204 A1 May 23, 2019

(51) Int. Cl.
*H04W 72/04* (2009.01)
*H04W 24/10* (2009.01)
*H04B 1/00* (2006.01)

(52) U.S. Cl.
CPC ........ *H04W 72/0453* (2013.01); *H04B 1/005* (2013.01); *H04W 24/10* (2013.01)

(58) Field of Classification Search
CPC ... H04W 72/0453; H04W 24/10; H04B 1/005
USPC ........................................................ 370/329
See application file for complete search history.

(56) References Cited

U.S. PATENT DOCUMENTS

| 6,952,563 B2 | 10/2005 | Brown |
| 7,315,533 B2 * | 1/2008 | Theobold ............ H04W 16/18 370/254 |
| 8,886,229 B2 | 11/2014 | Nanda et al. |
| 9,026,173 B2 | 5/2015 | Chandra |
| 2009/0042557 A1 * | 2/2009 | Vardi .................... H04W 72/02 455/422.1 |
| 2010/0322141 A1 * | 12/2010 | Liu ....................... H04W 24/10 370/315 |

(Continued)

FOREIGN PATENT DOCUMENTS

GB 2514548 A 12/2014

OTHER PUBLICATIONS

Joshi, G.P. et al., "Cognitive Radio Vifireless Sensor Networks: Applications, Challenges and Research Trends", MDPI Publishing Institute, Sep. 2013, 23 Pages.

*Primary Examiner* — Stephen J Clawson
(74) *Attorney, Agent, or Firm* — Brooks, Cameron & Huebsch, PLLC

(57) ABSTRACT

An example method comprising: assigning at least one band mode specified in the band mode list to a radio of the identified node, assigning a dual band mode to a set of wireless nodes of the plurality of wireless nodes that each satisfy a baseline coverage when operating on a low frequency band of the wireless band mode, assigning a high frequency band mode to a set of wireless nodes of the plurality of nodes based on band capacity, assigning a channel to the radio of the node on the high frequency band based on a band capacity; and responsive to assigning the channel to the radio on the high frequency band, assigning a channel to each radio of the set of nodes on the low frequency band.

20 Claims, 3 Drawing Sheets

(56) References Cited

U.S. PATENT DOCUMENTS

| | | | |
|---|---|---|---|
| 2011/0142025 A1* | 6/2011 | Agee | H04B 7/0413 370/342 |
| 2015/0271829 A1 | 9/2015 | Amini et al. | |
| 2015/0282032 A1* | 10/2015 | Gupta | H04W 36/22 370/237 |
| 2016/0066202 A1* | 3/2016 | Dayanandan | H04W 72/0453 370/252 |
| 2017/0111244 A1 | 4/2017 | Strater et al. | |
| 2018/0176284 A1* | 6/2018 | Strater | H04L 67/04 |

* cited by examiner

ASSIGN BAND MODES AND CHANNELS TO WIRELESS NODES

BACKGROUND

Within a wireless network environment, radios may be assigned an operating channel. The radios may be assigned an operating channel according a channel plan. A channel may be determined for radios within a wireless network environment by a network controller.

DETAILED DESCRIPTION

Figure 1:
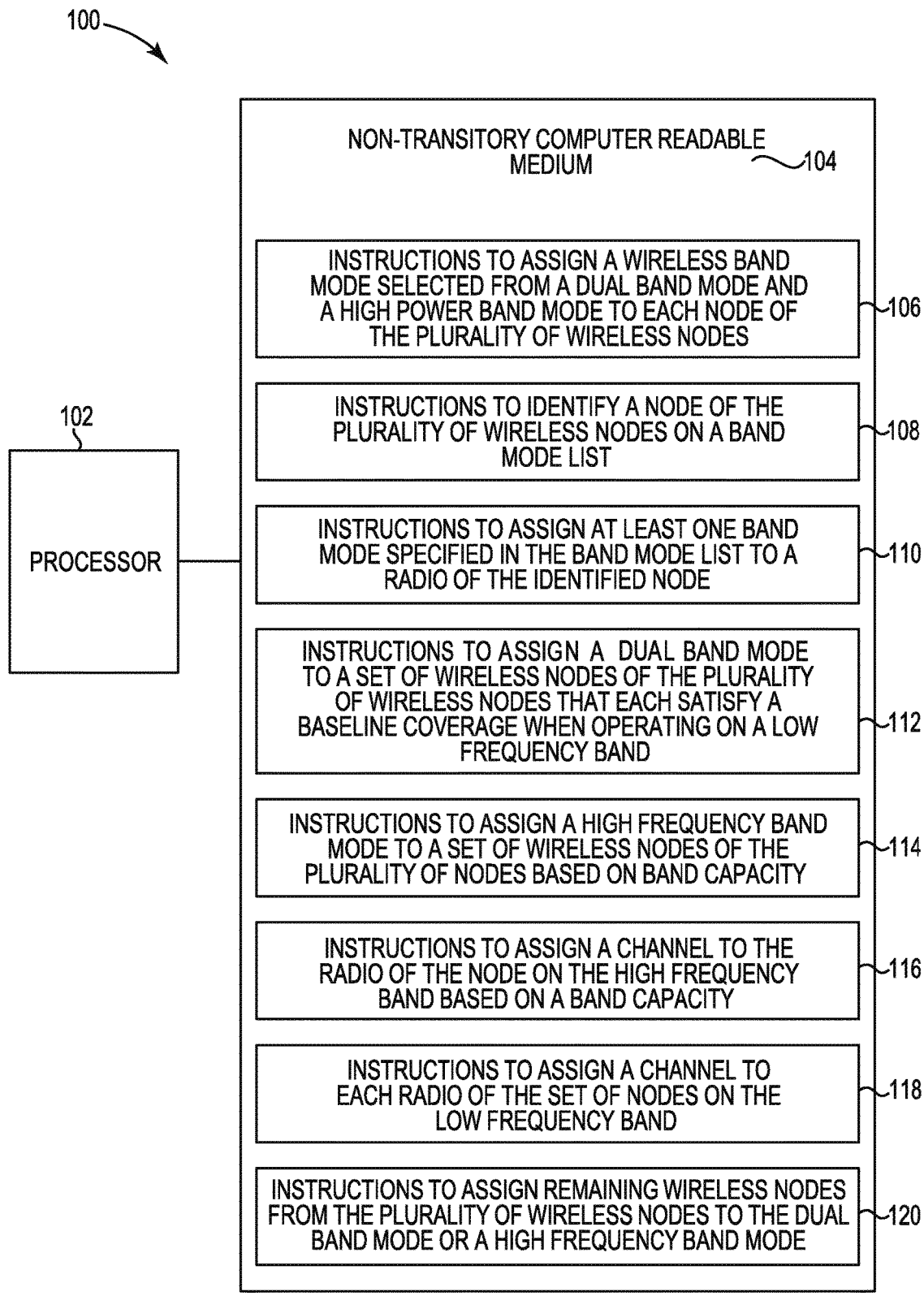
FIG. 1 is an example of a system to assign band modes and channels to wireless nodes with the present disclosure.

Access points (APs) may be used to provide devices access to a network. As used herein, an AP can refer to a networking device that allows a client device to connect to a wired or wireless network. The term AP can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

An AP may provide access to a wireless network, such as a Wireless Local Area Network (WLAN). As used herein, a WLAN can, for example, refer to a communications network that links two or more devices using some wireless distribution method (for example, spread-spectrum or orthogonal frequency-division multiplexing radio), and usually providing a connection through an AP to the Internet; and thus, providing users with the mobility to move around within a local coverage area and still stay connected to the network.

An AP may include one or a plurality of radios. As used herein, a radio refers to hardware on an AP to receive signals and transmit the received signals to other components within the AP. The radio of an AP may receive signals from within the WLAN, such as wireless signals, or the radio may receive external signals, such as from sources outside the WLAN.

Each AP within a WLAN may have the capability to operate on one, or more than one, channel. As used herein, a channel refers to a particular path through which signals and communications are able to move. A channel may operate within a particular frequency and may have a capacity to handle a particular amount of information over a particular period of time (for example, a channel may be able to transmit 1 GB of data per second, although examples are not so limited). A channel on which a particular AP is able to operate may be referred to as a feasible channel for the AP. In some examples, a radio of the AP may be operating on the channel.

A network, such as a WLAN, may have channels. As used herein, channel selection refers to a disposition of access points among various operating channels. As described above, each access point within a network may have the capability to operate on at least one feasible channel. A channel may therefore assign each of the access points within the network to a particular operating channel. A channel may be computed by a controller within the network.

As used herein, a controller refers to an interface between two devices. In some examples, a controller may be an interface between a peripheral device and a computing system, although examples are not so limited. A controller may further manage a connection between a device, such as an access point, and a network, or between a plurality of radios or APs within the network.

Multiple radios in the same band on a wireless device may be operated. Multiple radios in a wireless device may switch between multiple radio bands. For example, a band of each radio may be manually configured. As used herein, band refers to 2. gigahertz (GHz) or 5 GHz or greater frequency. For instance, a wireless devise composed of two radios and each radio operating on a different band is assigned to a dual band mode. Alternatively, all radios operating on 5 GHz or greater frequency is assigned to high frequency band mode. Yet in other instances, all radios operating on 2.4 GHz is assigned to a low frequency band mode.

A particular band mode may be selected at the network level from the information collected from each wireless device. The collected information may include the radio measurements such as pathloss measurement, and the client population and client capability. As used herein, pathloss may be due to many effects, such as free-space loss, refraction, diffraction, reflection, aperture-medium coupling loss, and absorption. Pathloss is also influenced by terrain contours, environment (urban or rural, vegetation and foliage), propagation medium (dry or moist air), the distance between the transmitter and the receiver, and the height and location of antennas. In some example, once the information is collected, a network connectivity graph per each band based on the pathloss measurements may be created. A particular channel may be selected for a network from a plurality of channels. Channels may be selected based on consideration of a plurality of characteristics. For example, an amount of interference may be one characteristic. As used herein, interference refers to any undesired energy within a system that interferes with reception and/or emission of signals. One form of interference is noise. As used herein, noise refers to interference that is able to occur on any channel and/or frequency. In some examples, noise may occur in response to an amount of traffic occurring on a channel. For example, noise may occur in response to a large amount of activity from client devices on a particular access point or particular channel.

Another characteristic may be distribution of channels. Distribution of channels refers to a number of radios, or APs, assigned to a particular channel. For example, a network may have ten wireless nodes and eleven available channels. A channel distribution for the network may indicate how many of the ten wireless nodes are assigned to each of the available channels. For instance, the channels may be distributed as follows: three nodes assigned to channel one, three nodes assigned to channel six, four nodes assigned to channel eleven, and no nodes assigned to the remaining channels.

A cost metric may be another characteristic to consider. As used herein, a cost metric refers to an amount of disruption that would be experienced when moving a radio from one channel to another channel. In some examples, cost metric may be related to interference. A cost metric may be determined to be high when moving a radio from one channel to a second channel is likely to cause a great amount of interference, while a cost metric may be determined to be low when a low amount of interference may be experienced when moving a radio between two channels.

A network node may be connection point that can receive, create, store and/or send data along distributed network routes. Each network node of a of a plurality of nodes may transmit and/or redistribute data to other network nodes based on programmed or engineered capability to recognize, process and forward transmissions.

In data communications, physical network nodes may include data communications equipment or devices that sit between data terminal equipment (DTE) and data transmission circuits. These may include switches, bridges, modems or hubs that perform signal conversion, coding and line clocking. Network nodes in data communications may also include data terminal equipment like digital telephone handsets, printers or host computers like routers, servers or workstations.

In internet and intranet networks, most physical network nodes may be host computers identified by an IP address. Some data link devices like wireless local area network (WLAN) access points do not have IP host addresses and are considered physical network or LAN nodes rather than internet nodes or hosts. In local area networks (LANs) and wide area networks (WANs), a network node may be a device that performs a specific function. In fixed telephone networks, nodes may be public or private telephone exchanges or a computer providing an intelligent network service.

Interference, distribution of channels, and cost metric may be considered as characteristics; however, examples are not so limited, and other characteristics may be considered. Additional characteristics may be considered based on particular usage goals of the network. In some examples, the characteristics of each channel of a plurality of channels may be enhanced based on the usage goals of the network. As used herein, refinement refers to the process of determining what use of a particular resource best meets particular goals for a system. Within a network, such as a WLAN, selection may include determining the usage goals of the network and computing which channels of a plurality of channels s meets or exceeds the usage goals of the network.

Channels selection may aid in promoting efficient usage of a network and its resources. However, channel selection may involve time-consuming computations and comparison, as each channel of a plurality of channels may be considered separately. While enhancing each channels of a plurality of channels individually may result in a determination of a best-fitting channels for the usage goals of a network, the computation time to make this determination may hinder the network and expend additional network resources. Moreover, networks may regularly re-compute channels; thus, re-selection may occur regularly. This may compound the amount of time spent on computing optimal channels s and reduce the amount of time a network is able to implement the channels. Wireless band modes and channels selection may aid in reduced computation time and enhance network level performance.

In some examples, selecting wireless band modes and channels according to the present disclosure may be performed in multiple stages. A wireless band mode may be first determined from dual band mode and a high frequency band mode. The wireless band modes may then be refined. In some examples, the initial mode selection is performed for those wireless devices with singleton feasible mode list of dual band mode or high frequency band mode. The mode assignment to wireless nodes may be determined based on coverage on low frequency band mode. The coverage may be determined based on the pathloss measurements from each wireless device. The smaller number of wireless devices discovered from each wireless device indicates smaller coverage. The greater pathloss measurement for each discovered wireless device also indicates the smaller coverage. Coverage can be defined in different ways. Once a baseline amount of coverage on the low frequency band mode is provided, a mode and a channel are assigned to wireless nodes based on capacity on high frequency band mode. In some examples, a boundary detection and/or low density area detection is performed to sample the wireless devices at the boundary and are forced to be in dual band mode to support activities at the boundary or low density area on low frequency band. To select the band mode at the network level, the information is collected from each wireless device. A boundary and/or low-density area may be determined in various manners. For instance, a low-density area may be determined based on the number of degrees on the graph and/or based on a pathloss distribution of discovered neighbors, among other possibilities.

Band mode at the network level is collected from each wireless device. Information include the radio measurements such as pathloss measurement, and the client population and client capability. Each wireless device may provide the radio measurement for every band it supports. Once the information is collected, it is possible to create the network connectivity graph per each band based on the pathloss measurements.

In the connectivity network graph, wireless devices are sampled at the boundary. In some examples, wireless devices are forced to be in dual band mode to support activities at the boundary of the low frequency band network graph. Wireless nodes inside the network graph may be sampled and forced to operate in dual band mode to have coverage on low frequency. Selection of samples may entail electing the wireless nodes in low frequency band from a set of wireless nodes.

A cost metric may be defined in terms of color conflict where the color set is defined the same as the set of modes. Given the client population and the radio density on low frequency band, percentage of the radios that are in the dual mode may be determined. This percentage is translated into color distribution. In one example, color distribution may be a constraint. Yet in another example, color distribution may be a part of cost metric. Various enhancements such as those employing a mathematical operation may be used to find band mode in this phase. All wireless devices determined to be in dual band mode may be marked. Once the first band mode is completed, based on the network connectivity graph on high frequency band, mode may be determined for the wireless devices which may not marked in the previous phase. At the same time, channels for these unmarked wireless devices and the radios on high frequency band from the wireless devices may be selected in dual band mode or high frequency band mode. Selection may be based on vector composed of both channels and modes, among other possibilities. As described herein, cost metric refers to network performance (capacity, throughput, etc.) for high frequency band. In one example, by minimizing the cost metric, enhanced modes may be determined to provide the best network level performance on high frequency band. At this stage, the band mode selection may be completed, thus completing channels selection for high frequency band. The channels may be selected for low frequency band. In an example, the channels on low frequency band can be selected by minimizing the cost metric.

A channel may be selected at the same time as the band mode. In some examples, the channels may be enhanced to meet a subset of network usage goals. By performing channel determination and optimization in multiple stages, computation time may be reduced, thus reducing the amount of resources used by the network to determine a channel.

FIG. 1 is an example of a system 100 for wireless band modes and channels selection consistent with the present disclosure. System 100 may include processor 102. System 100 may further include a non-transitory computer readable medium 104 which may store instructions, such as instructions 106, 108, 110, 112, 114, 116, 118 and 120. Although the following descriptions refer to a single processor and a single non-transitory computer readable medium, the descriptions may also apply to a system with multiple processors and multiple non-transitory computer readable media. In such examples, the instructions may be distributed (e.g., stored) across multiple non-transitory computer readable media and the instructions may be distributed (e.g., executed by) across multiple processors.

Processor 102 may be a central processing unit (CPU), a semiconductor based microprocessor, and/or other hardware devices suitable for retrieval and execution of instructions stored in non-transitory computer readable medium 104. Processor 102 may fetch, decode, and execute instructions 106, 108, 110, 112, 114, 116, 118, 120 or a combination thereof. As an alternative or in addition to retrieving and executing instructions, processor 102 may include at least one electronic circuit that includes electronic components for performing the functionality of instructions 106, 108, 110, 112, 114, 116, 118, 120 or a combination thereof.

Non-transitory computer readable medium 104 may be an electronic, magnetic, optical, or other physical storage device that stores executable instructions. Thus, non-transitory computer readable medium 104 may be, for example, Random Access Memory (RAM), an Electrically-Erasable Programmable Read-Only Memory (EEPROM), a storage drive, an optical disc, and the like. Non-transitory computer readable medium 104 may be disposed within system 100, as shown in FIG. 1. In this example, the executable instructions may be "installed" on the system.

Additionally, and/or alternatively, non-transitory computer readable medium 104 may be a portable, external or remote storage medium, for example, that allows system 100 to download the instructions from the portable/external/remote storage medium. In this situation, the executable instructions may be part of an "installation package", As described herein, non-transitory computer readable medium 104 may be encoded with executable instructions for channel determination.

Instructions 106, when executed by a processor such as processor 102, may include instructions to determine a wireless band mode from a dual band mode and a high frequency band mode to each node of the plurality of wireless nodes. In some example, system 100 may determine a wireless band mode to a particular path through which signals and communications are able to move. Processor 102 may determine a list of available wireless band modes based on the number of bands available within a wireless network. Each wireless device may provide the radio measurement for every band it supports. In order to get the measurement from non-selected band, wireless devices may scan non-operational band. Once the information is collected, it is possible to create the network connectivity graph per each band based on the pathloss measurements. A non-operational band is a band that is not engaged active duties.

Each wireless node of system 100 may have different capability or configuration in terms of which band may be used. Based on the configuration and the capability, the wireless band mode list is determined for each wireless node.

A band mode may be selected from a dual band mode and/or a high frequency band mode. As described herein, a dual band mode may comprise two wireless bands, a 2.4 GHz (GHz) wireless band and greater than 5 GHz wireless band. A high frequency band mode may comprise a greater than 5 GHz wireless band. A low frequency band may refer to a 2.4 GHz wireless band Instructions 108, when executed by a processor such as processor 102, may include instructions to determine a node from a plurality of nodes on a band mode list. As described herein, a band mode list may include dual band and high frequency band. In one example, connectivity network graph of low frequency band and boundary detection is performed to sample the wireless devices at the boundary. Dual band mode may be forcibly selected since the wireless devices support the client at the boundary of the low frequency band network graph. To sample the wireless nodes on the boundary, score may be computed for each wireless node, and the nodes may be sampled based on the score. One example of scoring may be the degrees on the bi-directional network graph.

Instructions 110, when executed by processor 102, may include instructions executable to assign at least one band mode specified in band mode list to a radio of the identified node. Each radio may have different capability or configuration in terms of which band may be used. Based on the configuration and the capability, the band mode list may be determined for each wireless node.

A radio refers to hardware on an AP to receive signals and transmit the received signals to other components within the AP. The number of nodes may be determined to correspond the number of APs within the wireless network; however, examples are not so limited, and the number of radios may exceed the number of APs when an AP or a plurality of APs include more than one radio. In some examples, the number of radios within the wireless network may be determined by a network controller (not shown in FIG. 1). In such examples, the network controller may serve as a central connection and/or manager between the APs in the wireless network; thus, the controller may determine the number of radios in the network by determining the number of radios being managed by the controller. In some examples, in dual band mode one radio may be on low frequency band 2.4 GHz, and another on high frequency band 5 Gz. In high frequency band mode both radios are on high frequency band 5 GHz.

Instructions 112, when executed by processor 102, may include instructions executable to assign a dual band mode to a set of wireless nodes of the plurality of wireless nodes that each satisfy a baseline coverage when operating on a low frequency band of the wireless band modes. In one example, to provide sufficiently coverage on low frequency band, wireless nodes inside the network graph are sampled and selected to operate in dual band mode. To sample the wireless nodes in low frequency band, selection is performed based on cost metric and color conflict determination. As used herein, cost metric is defined in terms of color conflict where the color set is defined the same as the set of modes. The state in the selection is defined by the selected color (selected band mode) for each wireless node. In one example color conflict between two devices, A and B, are: Color conflict (A,B)=0 if color (A) is not equal to color (B). Color conflict (A,B)>0 if color (A) is equal to color (B)

Further, instructions 112, when executed by processor 102, may include instructions executable to determine percentage of radios to be selected in the dual band mode from a function of client population information and radio density in low frequency band. Client population information may refer to percentage of clients operating on low frequency band, and/or percentage of clients capable of operating on low frequency band. In one example, function (F) is an increasing function percent of clients operating on low frequency band, and a decreasing function of radio density. Further, the percentage of clients operating on low frequency band, and/or percentage of clients capable of operating on low frequency band may be translated into color distribution, which may be considered either as a constraint or as a part of cost metric. In one example, the output from function (F) is x percent, percentage of wireless nodes in dual band mode is x while the percentage of wireless nodes in high mode is 100–x. In another example, when distribution is used as a constraint, the state vector is limited to the one meeting the color distribution. Yet in another example, color distribution may be considered as a part of a cost metric or objective function. Multiple objective optimization may be done to minimize the color conflict as well as the dissimilarity between the color distribution of the state and the color distribution determined from the function (F). All wireless devices determined to be in dual band are marked. Those wireless nodes marked to be in dual band mode may get the updated singleton feasible mode list of dual band mode. As used herein, singleton feasible mode list refers to band mode list of dual band or high frequency band.

Instructions 114, when executed by processor 102, may include instructions executable to assign a high frequency band mode to a set of wireless nodes of the plurality of nodes based on band capacity. Those wireless nodes marked to be in dual band mode get the updated singleton feasible mode list of dual band mode. As used herein, singleton feasible mode list refers to band mode list of dual band, 2.4 GHz and 5 GHz, or high frequency band, 5 GHz.

Instructions 116, when executed by processor 102, may include instructions executable to assign a channel to the radio of the node on the high frequency band based on a band capacity. In one example, modes may be determined for the wireless nodes with dual band and high frequency band known as non-singleton feasible mode list. Said differently, the mode list of dual band mode and high frequency band mode refers to non-singleton feasible mode list. As modes are selected for wireless nodes with non-singleton feasible mode list, channel operating on high frequency band may be determined. This selection may be based on vector composed of both channels and modes. In one example, cost metric may be based on network performance for high frequency band. In another example, having all radios on the same band may degrade the network level performance due to the increased level of interference on high frequency band. Yet, in another example, having all radios on the same band may increase the network level performance.

Instructions 116, when executed by processor 102, may further include instructions executable to select channels for high frequency bands when modes selection is completed. The channel assignment may be determined based on the number of nodes in the wireless band mode, determined by instructions 108, and/or the wireless band mode list, determined by instructions 106.

Instructions 118, when executed by processor 102, may include instructions executable to assign a channel to each radio of the set of nodes on the low frequency band.

Instructions 120, when executed by processor 102, may include instructions executable to assign remaining wireless nodes from the plurality of wireless nodes to the dual band mode or a high frequency band mode.

Figure 2:
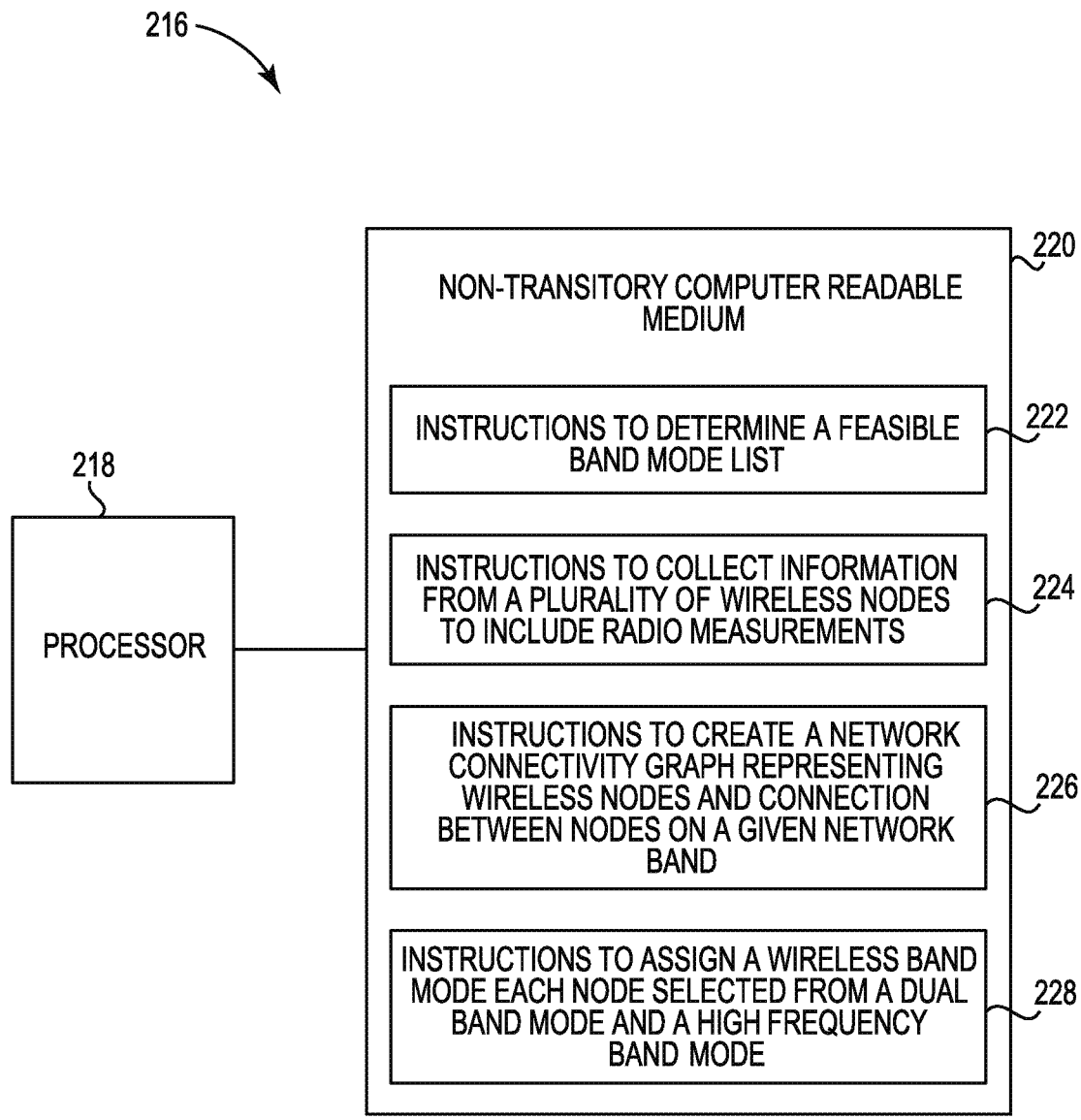
FIG. 2 is example of a controller to assign band modes and channels to wireless nodes consistent with the present disclosure.

FIG. 2 is an example controller 216 for assigning band modes and channels to wireless nodes consistent with the present disclosure. As used herein, a controller refers to a management device on a computer network. A controller may, for example, manage access points within a wireless local area network (WLAN). Controller 216 may include a processor 218. Processor 218 may be a central processing unit (CPU), a semiconductor based microprocessor, and/or other hardware devices suitable for retrieval and execution of instructions stored in non-transitory computer readable medium 220. Processor 218 may fetch, decode, and execute instructions 222, 224, 226, 228, or a combination thereof. As an alternative or in addition to retrieving and executing instructions, processor 218 may include at least one electronic circuit that includes electronic components for performing the functionality of instructions 222, 224, 226, 228, or a combination thereof.

Memory 220 may be an electronic, magnetic, optical, or other physical storage device that stores executable instructions. Thus, non-transitory computer readable medium 220 may be, for example, Random Access Memory (RAM), an Electrically-Erasable Programmable Read-Only Memory (EEPROM), a storage drive, an optical disc, and the like. Memory 220 may be disposed within controller 214, as shown in FIG. 2. In this example, the executable instructions may be "installed" on the network controller. Additionally, and/or alternatively, memory 220 may be a portable, external or remote storage medium, for example, that allows controller 216 to download the instructions from the portable/external/remote storage medium. In this situation, the executable instructions may be part of an "installation package". As described herein, memory 220 may be encoded with executable instructions for channels determination.

Instructions 222 may include instructions executable by processor 218 to determine a wireless band mode list. In some examples, the instructions 222 can further include instructions to determine a wireless band on the wireless band mode list. For instance, the wireless band can be selected from a dual band mode and a high frequency band mode. For example, each node of the plurality of wireless nodes can have a wireless band including a wireless band that corresponds to at least one wireless band of a dual band mode or a high frequency band mode.

In some example, controller 216 may determine a wireless band mode to a path through which signals and communications are able to move. Processor 218 may determine a list of available wireless band modes based on the number of bands available within a wireless network. Each wireless device may provide the radio measurement for every band it supports. To get the measurement from non-selected bands, wireless devices may scan non-operational bands. Once the information is collected, it is possible to create the network connectivity graph per each band based on the pathloss measurements.

In some examples, wireless band mode list may be determined by instructions 222 by the wireless network itself.

Instructions 224 may include instructions executable by processor 218 to collect information from a plurality of wireless nodes to include radio measurements. The collected information may include pathloss measurement, and information on client population and client operation. In one example, each wireless device may be able to provide the radio measurement for every band it supports. Once the information from a plurality of wireless nodes is collected, it may create the network connectivity graph per each band based on the pathloss measurements. In one example, one band mode may be selected over the other based on band mode availability. In another example, one band mode is selected over the other band mode based on users' pick.

In one example, a wireless device may be composed of two radios, supporting two modes and two available bands. The two bands may be high frequency band and low frequency band. In another example, high frequency band is selected over low frequency band. Yet in other examples, each radio in a dual band mode may operate on a different band. In high frequency band mode, all radios may operate on the high frequency band. In some examples, initial band mode selection starts with the dual band mode.

Instructions 226 may include instructions executable by processor 218 to create a network connectivity graph representing wireless nodes and connection between nodes on a given network band. In one example, Band mode at the network level is collected from each wireless device. Information include the radio measurements such as pathloss measurement, and the client population and client capability. Each wireless device may be able to provide the radio measurement for every band it supports. Once the information is collected, it is possible to create the network connectivity graph per each band based on the pathloss measurements.

In the connectivity network graph, boundary detection may be performed to sample the wireless devices at the boundary. In some examples, they are forced to be in dual band mode to support activities at the boundary of the low frequency band network graph. Wireless nodes inside the network graph may be sampled and forced to be operate in dual band to have sufficient coverage on low frequency. Selection is performed to sample the wireless nodes in low frequency band.

Instructions 228 may include instructions executable by processor 218 to assign a wireless band mode selected from a dual band mode and a high frequency band mode, to each node of the plurality of wireless nodes. In one example, instruction 228 may select a mode those wireless devices with singleton feasible mode list of dual band or high frequency band mode. The mode assignment to wireless nodes may be determined based on coverage on low frequency band mode. In another example, instruction 228 may assign a mode and a channel to wireless nodes based on capacity on high frequency band mode. In some examples, a boundary detection is performed to sample the wireless devices at the boundary and are forced to be in dual band mode to support activities at the boundary of low frequency band mode as described. To select the band mode at the network level, the information is collected from each wireless device. Band mode at the network level may be collected from each wireless device.

Figure 3:
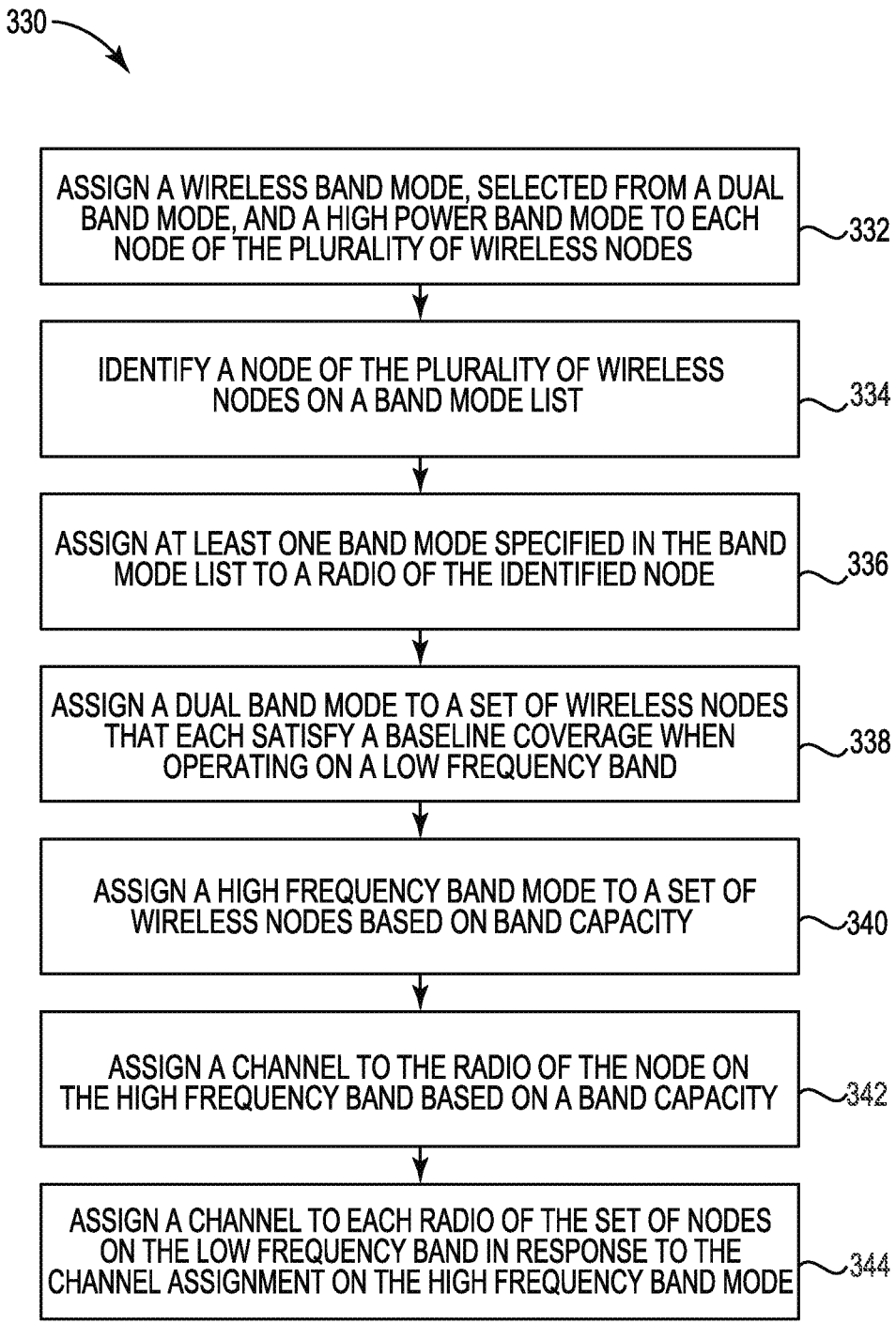
FIG. 3 is an example of a method to assign band modes and channels to wireless nodes consistent with the present disclosure.

FIG. 3 is an example method 330 for band network mode determination consistent with the present disclosure. At 332, method 330 may include assigning a wireless band mode from a dual band mode and a high frequency band mode to each node of the plurality of wireless nodes. In one example, method 330 may determine a wireless band mode to a path through which signals and communications are able to move. In another example, method 330 may determine a list of available wireless band modes based on the number of bands available within a wireless network. As described, each wireless device may provide the radio measurement for every band it supports. In order to get the measurement from non-selected band, wireless devices may scan non-operational band. Once the information is collected, method 330 may transmit the network connectivity graph per each band based on the pathloss measurements.

In some examples, each wireless node of a system may have different capability or configuration in terms of which band can be used. Based on the configuration and the capability, the wireless band mode list is determined for each wireless node.

A band mode may be selected from a dual band mode and/or a high frequency band mode. As described, a dual band mode may comprise a 2.4 GHz wireless band and greater than 5 GHz wireless band, a high frequency band mode may comprise a greater than 5 GHz wireless band. A low frequency band may refer to a 2.4 GHz wireless band.

At 334 the method 330 may include determining a node from a plurality of nodes on a band mode list. As described, a band mode list includes dual band and high frequency band. In one example, the connectivity network graph of low frequency band and boundary detection is performed to sample the wireless devices at the boundary. Dual band mode is forcibly picked since the wireless devices support the client at the boundary of the low frequency band network graph. In another example, to sample the wireless nodes on the boundary, method 330 may compute scores for each wireless node; and the nodes may be sampled based on the score. One example of scoring may be the degrees on the bi-directional network graph At 336, method 330 may include selecting at least one band mode specified in band mode list to a radio of the identified node. As described, each radio may have different capability or configuration in terms of which band may be used. Selecting 336 may further include determining a band mode list for each wireless node based on the configuration and the capability of each radio.

As described, a radio refers to hardware on an AP to receive signals and transmit the received signals to other components within the AP. The number of nodes may be determined to correspond the number of APs within the wireless network; however, examples are not so limited, and the number of radios may exceed the number of APs when an AP or a plurality of APs include more than one radio. In some examples, the number of radios within the wireless network may be determined by a network controller (not shown in FIG. 3). In such examples, the network controller may serve as a central connection and/or manager between the APs in the wireless network; thus, the controller may determine the number of radios in the network by determining the number of radios being managed by the controller. In some examples, in dual band mode one radio is on low frequency bank 2.4 GHz, and another on high frequency band 5 Gz. In high frequency band mode both radios are on high frequency band 5 GHz.

At 338, method 330 may include transmitting a dual band mode to a set of wireless nodes of the plurality of wireless nodes that each satisfy a baseline coverage when operating on a low frequency band of the wireless band mode. In one example, implementing 338 may provide coverage on low frequency band. Wireless nodes inside the network graph may be sampled and selected to operate in dual band mode. In another example, to sample the wireless nodes in low frequency band, selection is performed based on cost metric and color conflict determination. As described previously, cost metric is defined in terms of color conflict where the color set is defined the same as the set of modes. The state in the selection is defined by the selected color (selected band mode) for each wireless node. In one example color conflict between two devices, A and B, are:

Color conflict (A,B)=0 if color (A) is not equal to color (B).
Color conflict (A,B)>0 if color (A) is equal to color (B)

Further, method 330 may transmit assign instructions to determine percentage of radios to be selected in the dual band mode from a function of client population information and radio density in low frequency band. Client population information may refer to percentage of clients operating on low frequency band, and/or percentage of clients capable of operating on low frequency band. In another example, function (F) may be an increasing function percent of clients operating on low frequency band, and a decreasing function of radio density. Further, the percentage may be translated into color distribution, and may be considered either as a constraint or as a part of cost metric. In one example, the output from function (F) is x percent. Percentage of wireless nodes in dual band mode is x while the percentage of wireless nodes in high mode is 100−x. In another example, when distribution is used as a constraint, the state vector may be limited to the one meeting the color distribution. Yet in another example, distribution considered as a part of a cost metric or objective function may minimize the color conflict. As described, all wireless devices determined to be in dual band are marked. Those wireless nodes marked to be in dual band may be updated to singleton feasible mode list of dual band. Singleton feasible mode list refers to band mode list of dual band or high frequency band.

At 340, method 330 may include assigning a high frequency band mode to a set of wireless nodes of the plurality of nodes based on band capacity. In one example, wireless nodes marked to be in dual band may be assigned to the updated singleton feasible mode list of dual band. As described, singleton feasible mode list refers to band mode list of dual band, 2.4 GHz and 5 GHz, or high frequency band, 5 GHz.

At 342, method 330 may assign a channel to the radio of the node on the high frequency band based on a band capacity. In one example, modes may be determined for the wireless nodes with dual band and high frequency band known as non-singleton feasible mode list. Said differently, the mode list of dual band and high frequency band refers to non-singleton feasible mode list. As modes are selected for wireless nodes with non-singleton feasible mode list, channel for the operating on high frequency band may be determined. This selection may be based on vector composed of both channel and mode. In one example, cost metric may be based on network performance for high frequency band. In another example, having all radios on the same band may degrade the network level performance due to the increased level of interference on high frequency band. Yet, in another example, having all radios on the same band may increase the network level performance.

Method 330 may further assign instructions to select channels or high frequency band when mode selection is completed. The channel assignment may be determined based on the number of nodes in the wireless band mode, as described previously herein.

At 344, method 330 may assign a channel to each radio of the set of nodes on the low frequency band in response to the channel assignment on the high frequency band mode.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A method comprising:
assigning a wireless band mode, selected from a dual band mode and a high frequency band mode to each node of the plurality of wireless nodes by:
identifying a node of the plurality of wireless nodes on a band mode list;
assigning at least one band mode specified in the band mode list to a radio of the identified node;
assigning a dual band mode to a set of wireless nodes of the plurality of
wireless nodes that each satisfy a baseline coverage when operating on a low frequency band of the wireless band mode;
assigning a high frequency band mode to a set of wireless nodes of the plurality of nodes based on band capacity;
assigning a channel to the radio of the node on the high frequency band based on a band capacity; and
responsive to assigning the channel to the radio on the high frequency band, assigning a channel to each radio of the set of nodes on the low frequency band.

2. The method of claim 1, wherein the wireless nodes on a boundary or a low radio density area are detected based on a network connectivity graph.

3. The method of claim 1, wherein each wireless node of the plurality wireless nodes provides radio measurement for at least one wireless band each wireless node supports.

4. The method of claim 1, wherein the band mode list for each wireless node of the plurality of wireless nodes includes a high frequency band mode or a dual band mode.

5. The method of claim 4, wherein the band mode list of the high frequency band mode and the dual band mode is automatically selected based on information periodically collected from wireless nodes.

6. The method of claim 1, wherein each radio operates on an assigned band.

7. The method in claim 6, wherein the radios in the dual band mode are determined as a function of at least one of a percentage of clients operating on a low frequency band and percentage of radio density operating on a low frequency band.

8. The method of claim 1, wherein a baseline coverage corresponds to the low frequency band for each wireless node to support the network connectivity graph.

9. A network device comprising:
a processing resource; and
a memory resource storing machine readable instructions to cause the processing resource to:
assign a wireless band mode, selected from a dual band mode and a high frequency band mode to each node of the plurality of wireless nodes by:
identifying a node of the plurality of wireless nodes on a band mode list;
assigning at least one band mode specified in the band mode list to a radio of the identified node;
assigning a dual band mode to a set of wireless nodes of the plurality of wireless nodes that each satisfy a baseline coverage when operating on the low frequency band;
assigning a high frequency band mode to a set of wireless nodes of the plurality of nodes based on band capacity;
assigning a channel to the radio of the node on the high frequency band based on a band capacity;
responsive to assigning the channel to the radio on the high frequency band, assigning a channel to each radio of the set of nodes on the low frequency band; and
assign remaining wireless nodes from the plurality of wireless nodes to the dual band mode or a high frequency band mode.

10. The network device of claim 9, wherein the wireless nodes include a mobile phone, a laptop, a host computer, a printer, a personal digital assistant, a data terminal equipment or combinations thereof.

11. The network device of claim 9, wherein the low frequency band further comprises a 2.4 GHz wireless band.

12. The network device of claim 9, wherein the high frequency band further comprises a greater than 5 GHz wireless band.

13. The network device of claim 9, wherein the dual band further comprises a 2.4 GHz wireless band and greater than 5 GHz wireless band.

14. The network device of claim 9, wherein the node further comprises a network controller.

15. A non-transitory computer readable medium storing instructions executable by a processing resource to:
assign a wireless band mode, selected from a dual band mode and a high frequency band mode to each node of the plurality of wireless nodes by:
identify a node of the plurality of wireless nodes on a band mode list;
assign at least one band mode specified in the band mode list to a radio of the identified node;
assign a dual band mode to a set of wireless nodes of the plurality of
wireless nodes that each satisfy a baseline coverage when operating on a low frequency band of the wireless band mode;
assign a high frequency band mode to a set of wireless nodes of the plurality of nodes based on band capacity;
assign a channel to the radio of the node on the high frequency band based on a band capacity; and
responsive to assigning the channel to the radio on the high frequency band, assigning a channel to each radio of the set of nodes on the low frequency band.

16. The non-transitory computer readable medium of claim 15, wherein the wireless nodes on a boundary or a low radio density area are detected based on a network connectivity graph.

17. The non-transitory computer readable medium of claim 15, wherein each wireless node of the plurality wireless nodes provides radio measurement for at least one wireless band each wireless node supports.

18. The non-transitory computer readable medium of claim 15, wherein the band mode list for each wireless node of the plurality of wireless nodes includes a high frequency band mode or a dual band mode.

19. The non-transitory computer readable medium of claim 18, wherein the band mode list of the high frequency band mode and the dual band mode is automatically selected based on information periodically collected from wireless nodes.

20. The non-transitory computer readable medium of claim 15, wherein each radio operates on an assigned band.

* * * * *